United States Patent
Crawford et al.

(10) Patent No.: US 7,479,176 B2
(45) Date of Patent: Jan. 20, 2009

(54) SEQUENTIAL ADSORPTION DESICCANT DRYER SYSTEM

(75) Inventors: Robert R. Crawford, Stafford, VA (US); Donald D. Rainville, Stafford, VA (US)

(73) Assignee: Mann & Hummel Protec GmbH, Bensheim (DE)

( * ) Notice: Subject to any disclaimer, the term of this patent is extended or adjusted under 35 U.S.C. 154(b) by 396 days.

(21) Appl. No.: 11/296,506

(22) Filed: Dec. 8, 2005

(65) Prior Publication Data

US 2006/0117951 A1 Jun. 8, 2006

Related U.S. Application Data

(60) Provisional application No. 60/634,111, filed on Dec. 8, 2004.

(51) Int. Cl.
*B01D 53/04* (2006.01)
*B01D 53/26* (2006.01)

(52) U.S. Cl. .............................. 95/148; 96/115; 96/130; 96/131

(58) Field of Classification Search ................ 95/117.5, 95/148; 96/115, 121–133, 143; 34/330, 34/473
See application file for complete search history.

(56) References Cited

U.S. PATENT DOCUMENTS

| | | | |
|---|---|---|---|
| 4,413,426 A | 11/1983 | Graeff | |
| 4,600,511 A | 7/1986 | Sherman et al. | |
| 4,656,757 A | 4/1987 | Oschmann | |
| 4,828,694 A | 5/1989 | Leason | |
| 6,113,674 A * | 9/2000 | Graham et al. | ................. 95/148 |
| 6,533,847 B2 * | 3/2003 | Seguin et al. | ................. 96/129 |
| 2003/0136266 A1 | 7/2003 | Renz | |

FOREIGN PATENT DOCUMENTS

FR 2 762 794 A1 11/1998
WO WO 00/13763 A1 3/2000

OTHER PUBLICATIONS

European Search Report dated Mar. 29, 2006 (Six (6) pages).
European Search Report dated Jul. 12, 2006 (Three (3) pages).

* cited by examiner

*Primary Examiner*—Frank M Lawrence
(74) *Attorney, Agent, or Firm*—Crowell & Moring LLP

(57) ABSTRACT

A method and an apparatus for controlling airflow in a desiccant drying system having a plurality of desiccant beds, in which each desiccant bed is located in a chamber, and multi-position valves can be operated to cause the gas to be dried to flow in a serial manner through a plurality of desiccant bed chambers while another desiccant bed is isolated from the gas flow and undergoing regeneration. Once regenerated, the multi-position valves are repositioned to establish a new serial flow gas path in which the freshly regenerated desiccant bed becomes the final bed in the series, and another bed undergoes regeneration.

3 Claims, 2 Drawing Sheets

Fig.1a

SEQUENTIAL ADSORPTION DESICCANT DRYER SYSTEM

This Application claims the benefit of priority under 35 U.S.C. § 119(e) to U.S. provisional application Ser. No. 60/634,111 filed Dec. 8, 2004, the disclosure of which is expressly incorporated by reference herein.

BACKGROUND AND SUMMARY OF THE INVENTION

The present invention relates to a system and a method for controlling airflow in a multiple bed desiccant drying system.

Multiple desiccant bed systems are known for drying, for example, a synthetic plastic material, in which a moisture-laden gas stream is formed as the exit gas from a hopper in which plastic granules are dried by a stream of drying air. During an adsorption phase, the exit gas from the hopper is conducted through one or more drying vessels filled with an adsorption medium, whereby the adsorption medium extracts the moisture from the gas so that the resulting dry gas can be used again as a drying gas for drying plastic granules. Existing multiple desiccant bed systems designs use desiccant beds or moving rotors containing desiccant, with the individual desiccant elements being arranged in a parallel grouping, such that the dry gas effluent is a combination of the gas dried thru out the system. As a result, the quality of the dry gas effluent can vary, as variations in water loading in individual desiccant beds may result in a portion of the effluent gas having a higher than desired water content, which in turn leads to undesired increases in the water content of the recombined dry gas volumes.

When the adsorption medium in a drying vessel is saturated with moisture, the drying vessel is typically transferred to a regeneration phase in which heated ambient air is conducted through the adsorption medium, which takes up and carries away the moisture which was adsorbed therein. By using a multiple bed system, the drying process can be continued essentially without interruption, by utilizing one or a portion of the beds for adsorption, while simultaneously regenerating other beds, by appropriately channeling the process air flow. Even with this regeneration process, however, in parallel-grouped multiple desiccant bed systems the dry effluent gas remains a mixture of gas with varying moisture content exiting from the desiccant beds that remain on-line as other beds are regenerated.

Thus, there is a need for an improved system and method for providing a dry gas effluent from a multiple desiccant bed system which has a consistently low moisture content.

The present invention addresses the foregoing problems by providing a multiple desiccant bed system in which three or more desiccant chambers, each containing its own adsorbing desiccant bed along with a heater element for regeneration of the individual desiccant bed, are operated in series, with the ability to remove at least one of the desiccant beds from the gas flow circuit during bed regeneration while gas flow continues in the remaining desiccant bed(s). Further, the system is arranged to permit the desiccant bed most recently regenerated, and thus having the lowest bed moisture loading and producing the driest gas effluent, to be located in the finishing position at the end of the series of desiccant beds. The present invention thereby provides a better quality of dry gas effluent, as the dry gas always will leave a more recently regenerated desiccant bed than in current parallel flow desiccant bed designs.

In an embodiment of the present invention, multiple desiccant beds are arranged about a vertical axis, so that the air flow will pass horizontally through the desiccant beads in the beds. This arrangement has the benefit of enabling the top of the bed to have a reservoir of desiccant above the working material to allow for settling or attrition. The desiccant beds can be arranged in a variety of configurations, including a square or circular pattern, depending on how many individual beds are required.

Above the bed assembly there is provided an inlet plenum for wet gas influent. A similar outlet plenum is provided below the bed assembly for dry air discharge. Note that the references to a top inlet and a bottom discharge are illustrative only, as the whole arrangement can be built in any number of ways as long as the beds are interconnected by adjoining common partitions or ducting.

The desiccant bed chambers in this embodiment are arranged such that interconnecting ducts permit gas flow in series between the chambers, with a loop duct re-routing air flow from the bed at the end of the series back to the first bed in the series. Each desiccant bed chamber is provided with a connection to a common wet gas inlet plenum. The inlet plenum is shared with the other beds. Each bed chamber also has a connection to a common dry gas outlet plenum shared with the other beds. The gas flow between the inlet and outlet plenums and between the desiccant bed chambers is controlled by a plurality of three-way valve units, with one three-way valve being associated with each chamber. In addition, each chamber is provided a one-way valve through which air from outside the system, such as room air, may be introduced to the chamber during bed regeneration. The outside air is drawn into the chamber by suction generated by a regeneration blower, which advantageously applies suction to the chamber through a port and valve arrangement integrated into each three-way valve unit valve actuator.

The method employed to operate this system is as follows. There are three individual positions that will provide control of the adsorption gas circuit through the system. The first valve position opens lifts a first valve element, such as a valve disc, off its seat, allowing the incoming wet gas to pass from the inlet plenum into the desiccant system. After passing though the first desiccant bed, the gas passes into the next desiccant bed chamber by passing through a second valve seat of the next chamber's valve unit (this seat may also be referred to as a "pass-through port"), which is opened by lifting a second valve element off the second valve seat. The first valve seat of the second chamber's valve unit remains closed, so that the wet gas in the inlet plenum cannot enter the second desiccant bed chamber except from the first chamber through the second valve seat. This valve position will be used for all desiccant beds that are not in one of the other defined positions.

After entering the second desiccant bed chamber though this "pass through" opening, the gas passes through the second desiccant bed for further drying. The gas then may subsequently pass through as many desiccant bed chamber stages as desired. At the last chamber in the desired flow path, instead of directing the gas through the second seat of the next chamber's valve unit, the next chamber's valve unit is positioned such that the second seat remains closed and a third valve element is lifted off a third valve seat located in the previous chamber. This third valve seat in the previous chamber is a port connecting the chamber to the dry gas outlet plenum, and therefore the dried gas flows from the last, or finishing, desiccant bed chamber into the dry gas outlet plenum. The dry gas may then be extracted from the plenum for use elsewhere. In the event the finishing chamber is also the physically last chamber in the multiple desiccant bed unit, the outlet side of its bed is connected via the return loop duct which directs the gas flow into the inlet side of the physically first desiccant bed chamber.

The desiccant bed chamber having its valve unit in the third position, i.e., with its first and second valve seats closed, is isolated from the gas drying flow circuit. Accordingly, while other desiccant bed chambers are being used for wet gas drying, the "off-line" chamber may be regenerated as follows. A regeneration control valve integrated into the chamber's valve unit is operated to open a regeneration port to the chamber. A regeneration blower may then apply suction to the chamber to draw regenerating air across the desiccant bed. When suction is applied to the regeneration port, a one-way check valve in the wall of the chamber is drawn open, allowing outside air to enter the chamber to flow across the desiccant bed. One of ordinary skill will be able to readily envision other approaches to obtaining the desired outside air flow across the desiccant bed, such as by supplying compressed air to the chamber, and opening a port to the outside on the other side of the bed to permit the regenerating air to escape the chamber.

Once a desiccant bed has been regenerated, the valve units are preferably repositioned so that the most recently regenerated desiccant bed chamber is made the finishing chamber, with its connection to the dry gas outlet plenum being open. This ensures the gas leaving the multiple desiccant bed system will always achieve the lowest possible gas moisture content.

Other objects, advantages and novel features of the present invention will become apparent from the following detailed description of the invention when considered in conjunction with the accompanying figures.

BRIEF DESCRIPTION OF THE DRAWINGS

FIG. 1a is a detail view of a desiccant bed in the apparatus of FIG. 1.

DETAILED DESCRIPTION OF THE DRAWINGS

Figure 1:
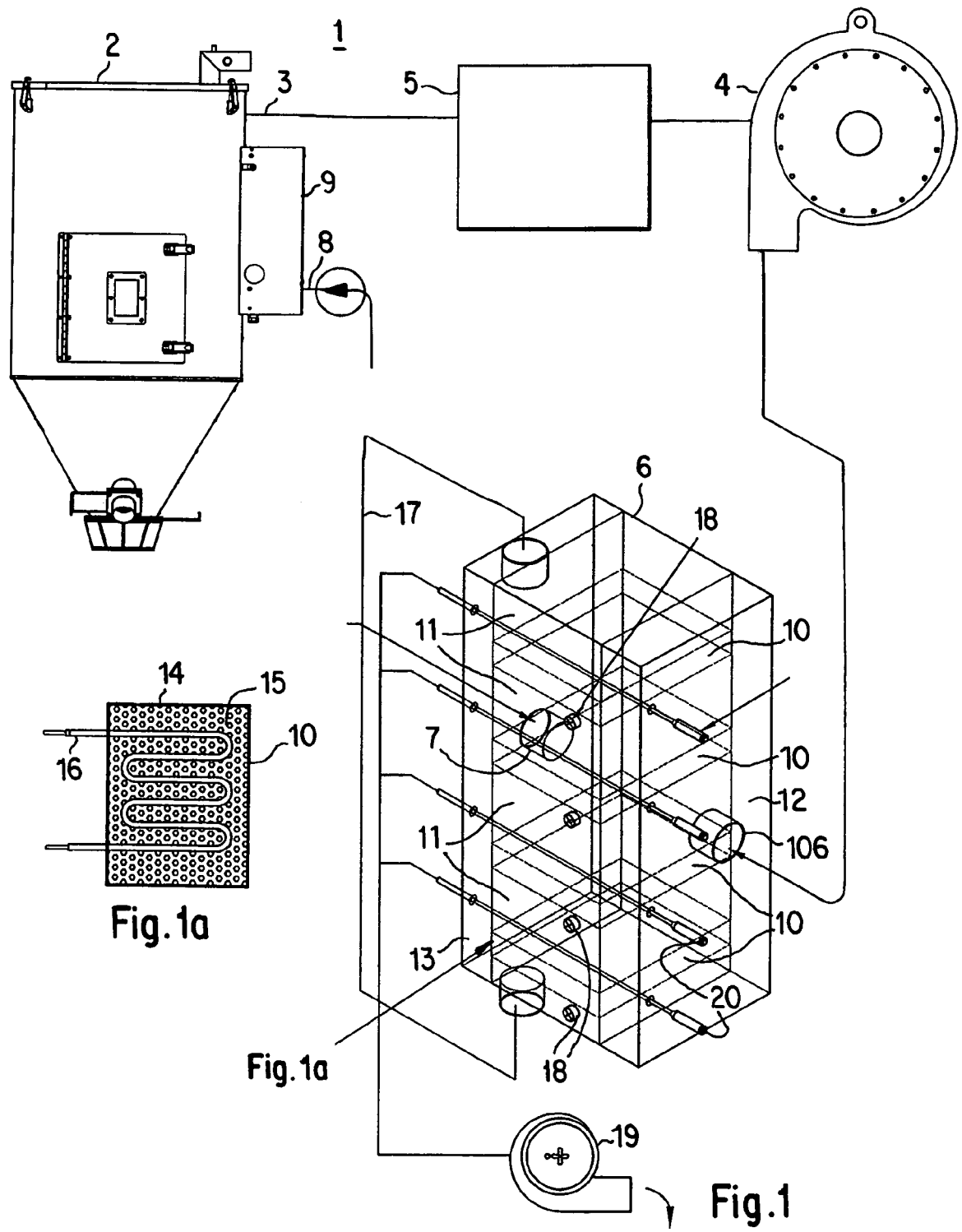
FIG. 1 is an oblique schematic illustration of an embodiment of the present invention.

FIG. 1 illustrates schematically a material drying system incorporating a multiple desiccant bed gas drying system in accordance with an embodiment of the present invention. In the system 1, a process unit 2 containing a product material to be dried, such as plastic beads being formed in a crystallization process, is exposed to a drying gas. The expended drying gas, now a wet gas, is drawn out of the process unit 2 via an process unit outlet 3 by a process blower 4. The process blower 4 takes suction on the process unit outlet 3 via a process filter 5 which removes any remaining entrained product material before it enters the blower. The wet gas is passed from the process blower 4, into a wet gas inlet (also referred to as "wet air inlet") 106 of a multiple desiccant bed dryer unit 6. After passing through the desiccant dryer unit 6, the now dried gas passed out of a dry gas outlet 7, and the dried gas is reintroduced into process unit 2 via a process unit inlet 8 and gas heater 9 which heats the dried gas to a desired inlet temperature.

Within the multiple desiccant bed dryer unit 6 are a plurality of desiccant beds 10 located in individual desiccant bed chamber 11. Each chamber 11 communicates on one side with a common wet gas inlet plenum 12, and on an opposite side with a common dry gas outlet plenum 13. As shown in FIG. 1a, each desiccant bed 10 includes a molecular sieve 14 containing desiccant beads 15, and a heater circuit 16 imbedded therein for use during bed regeneration to drive off excess moisture in the bed.

Figure 2:
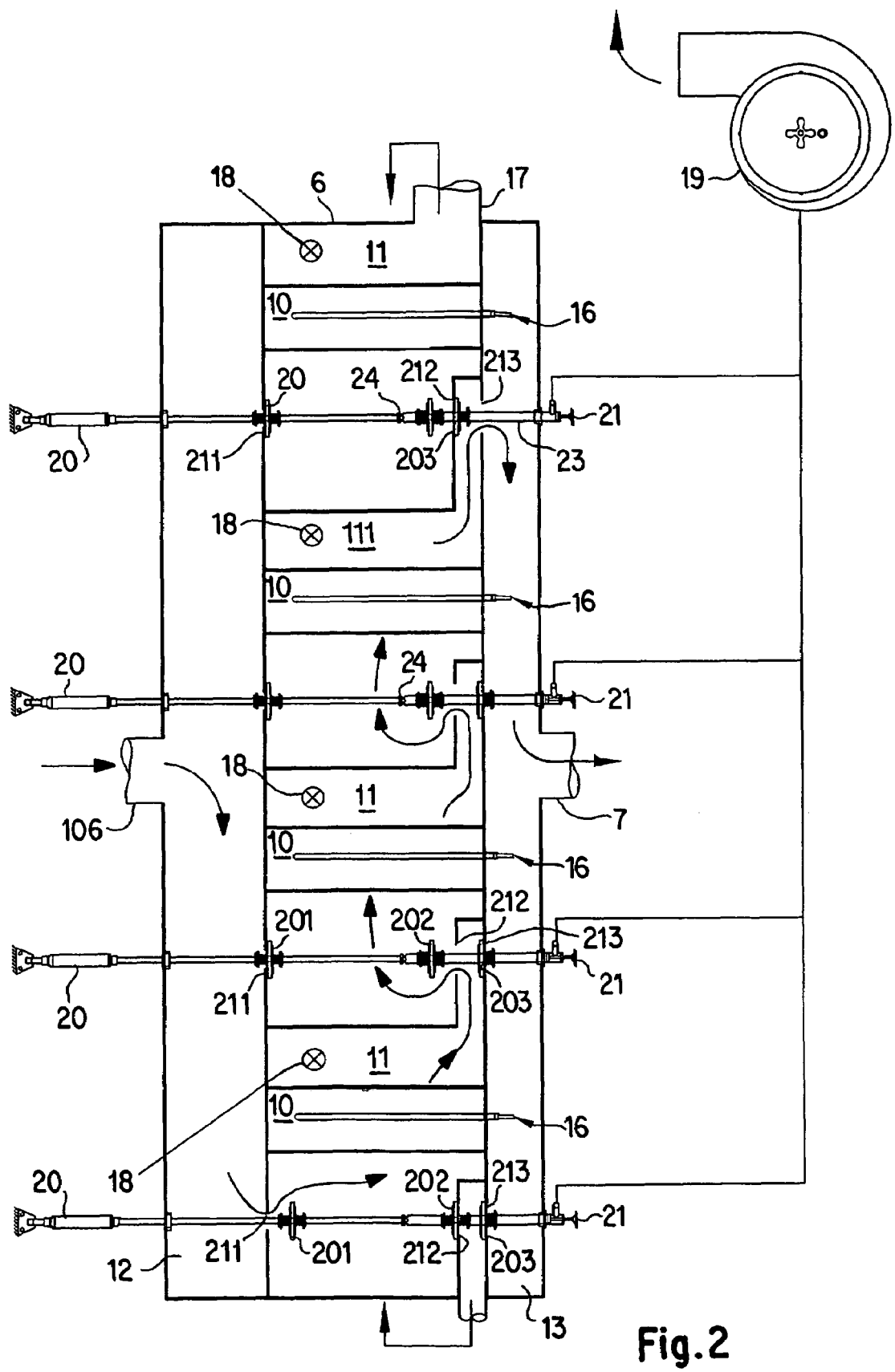
FIG. 2 is a schematic illustration of the embodiment of the present invention shown in FIG. 1.

Each chamber also communicates with its adjacent plenum through ports (not illustrated in FIG. 1, shown in FIG. 2). The desiccant chamber at the top of the desiccant bed dryer unit 6 communicates with the desiccant chamber at the bottom of the dryer unit via a loop duct 17. Each chamber is also provided with a one-way check valve 18 which allows room air to enter the chamber when the pressure within the chamber is below the ambient air pressure, as when suction is applied by a regeneration blower 19. Gas flow through the chambers 11 is controlled by three-way valves 20, which are discussed further in connection with FIG. 2.

FIG. 2 illustrates the valve and flow arrangements on the present embodiment, and will be used to describe the method of operation of the present invention. Wet gas (also referred to as "wet air") flows into inlet plenum 12. In the chamber 11 at the bottom of the desiccant bed stack, the valve unit 20 is in moved into a first operating position in which a first valve element 201, in this embodiment a circular plate, is positioned off its first valve seat 211. In this first position, the second valve element 202 and third valve element 203 are closed against their respective valve seats 212, 213. The first valve elements of the valve units in the remaining desiccant bed chambers are closed. As a result of this configuration, the wet gas entering inlet plenum 12 enters the bottom desiccant bed chamber.

In the next desiccant bed chamber 11 above the bottom chamber, its valve unit is moved into a second operating position, in which its first valve element 201 and third valve element 203 are seated against their respective valve seats 211, 213, and its second valve element 202 is off its second valve seat 212. The gas which entered the bottom chamber is thereby permitted to pass serially from the previous (bottom) desiccant bed chamber 11 into the next chamber. Similarly, the valve unit in each sequentially subsequent chamber 11 may be placed in its second valve position to permit the gas to pass serially through as many of the desiccant beds of multiple desiccant bed dryer unit 6 as is desired.

The gas drying process concludes with the passage of the gas into the final, or finishing, desiccant bed chamber 11 in the series. In the embodiment shown in FIG. 2, the finishing chamber is the third chamber from the bottom of the drying unit 6, chamber 111. After the gas passes through the finishing chamber's valve unit 20, which is also in its second position, it passes to an outlet side of the chamber's desiccant bed 10. Then, rather than passing through the second valve seat of the next chamber's valve unit, the next chamber's valve unit 20 is moved to a third position, in which the valve unit's first valve element 201 is closed against its seat 211, and its third valve element 203 has moved off its third valve seat 213 and closed off the second valve seat 212. The now dry gas therefore passes out of the outlet side of the finishing chamber into the dry gas outlet plenum 13, and is withdrawn via the dry gas outlet to be returned to process unit 2.

During the foregoing gas drying process, the desiccant bed chamber downstream of the finishing chamber is undergoing regeneration. In the embodiment shown in FIG. 2, it is the top chamber's desiccant bed that is being regenerated. Because this chamber's valve unit 20 is in the third valve position, with its first and third valve elements resting against the first and second valve seats, the chamber is isolated from the gas in wet gas inlet plenum 12 and dry gas outlet plenum 13, and therefore regeneration may proceed within the chamber without effect on the gas drying process in the other chambers.

The regeneration process is facilitated in this embodiment by the incorporation of a regeneration control valve in each in each valve unit 20. The regeneration valve 21 communicates, via an internal passage in the valve unit valve stem 23 and a regeneration port 24, with its corresponding chamber 11. When the regeneration valve 21 is opened, the regeneration blower 19 applies suction to the chamber via port 24. The resulting reduced pressure in the chamber causes the regeneration air inlet check valve 18 in the chamber to lift off its seat, allowing outside air to be drawn into chamber 11, across desiccant bed 10, and into port 24. The moisture-laded air coming off bed 10 is, in this embodiment, exhausted from the regeneration blower 19 back to the outside atmosphere.

Once a desiccant bed 10 is regenerated, the valve units 20 may be repositioned as desired to establish a new series gas flow path through the multiple desiccant bed dryer unit 6. Preferably, the valve unit in the regenerated desiccant bed chamber is moved from its third valve position into the second valve position, the valve unit 20 in the next chamber is moved to its third position, and a downstream valve unit 20 is moved to its first position. As a result, the incoming wet gas is now introduced into a different chamber, the freshly regenerated chamber is now the finishing chamber from which the dry gas passes into the dry gas outlet plenum 13, and desiccant bed in the chamber immediately downstream of the new finishing chamber may be regenerated. In the embodiment illustrated in FIG. 2, the chamber at the bottom of the stack would be the regenerating chamber, and the finished dry gas from the top chamber would be conveyed via loop duct 17 to the dry gas outlet plenum 13 through the bottom third valve seat 213.

The foregoing disclosure has been set forth merely to illustrate the invention and is not intended to be limiting. Accordingly, since modifications of the disclosed embodiments incorporating the spirit and substance of the invention may occur to persons skilled in the art, the invention should be construed broadly to include everything within the scope of the appended claims and equivalents thereof.

What is claimed is:

1. A method for controlling gas flow in a multiple bed desiccant drying system, the system including a plurality of desiccant beds disposed in corresponding chambers within a desiccant bed module, each chamber having a multi-position valve controlling gas flow into and from the chamber, comprising the steps of:

introducing a gas to an inlet of the desiccant bed module;

positioning each of the multi-position valves to cause the gas to pass from the inlet serially through each of a subset of the plurality of desiccant bed chambers, while a remaining one of the desiccant bed chambers is isolated from its adjacent chambers and the gas;

passing the gas from the inlet serially through the desiccant bed chambers and out a desiccant bed module outlet;

regenerating the desiccant bed in the isolated chamber while the gas is passing serially from the module inlet to the module outlet; and thereafter repositioning the plurality of multi-position valves to simultaneously isolate another of the desiccant bed chambers from its adjacent chambers and the gas, and to the cause the freshly regenerated desiccant bed to be the final desiccant bed through which the gas serially flows before passing out of the desiccant bed module.

2. A multiple bed desiccant drying system, comprising:

a desiccant bed module with a gas inlet, a gas outlet, and a plurality of desiccant beds disposed in corresponding desiccant bed chambers, wherein the chambers all communicate with the gas inlet and all communicate with the gas outlet;

a plurality of multi-position valves, each multi-position valve controlling at least the flow of a gas from the gas inlet into one chamber, the flow of gas into the chamber from an adjacent chamber, and the flow of gas from a chamber to the gas outlet; and a desiccant bed regeneration system, wherein the plurality of multi-position valves are positionable to cause the gas to pass from the inlet into one of the chambers, thereafter serially through each of a subset of the plurality of desiccant bed chambers, and from a final chamber in the series of chambers to the gas outlet, while a remaining one of the desiccant bed chambers is isolated from its adjacent chambers and the gas, and wherein the multi-position valves are repositionable to simultaneously isolate another of the desiccant bed chambers from its adjacent chambers and the gas, and to the cause the freshly regenerated desiccant bed to be the final desiccant bed through which the gas serially flows before passing out of the desiccant bed module.

3. The multiple bed desiccant drying system of claim 2, further comprising a valve position controller controlling the positioning of the multi-position valves.

* * * * *